May 16, 1950  B. LEUTHOLD  2,507,725
GEAR CUTTING MACHINE
Filed Aug. 3, 1948  4 Sheets-Sheet 4
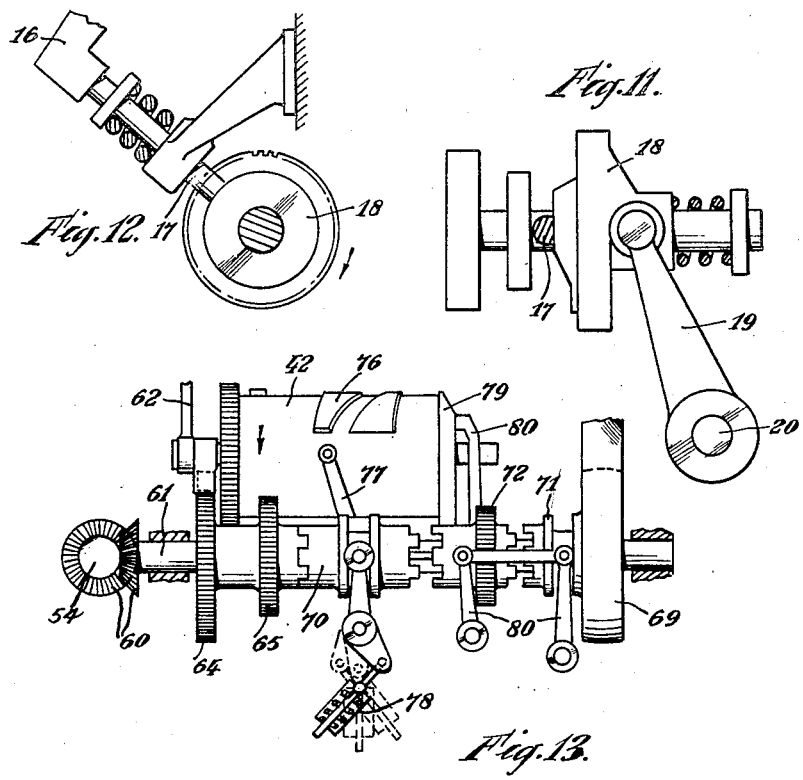
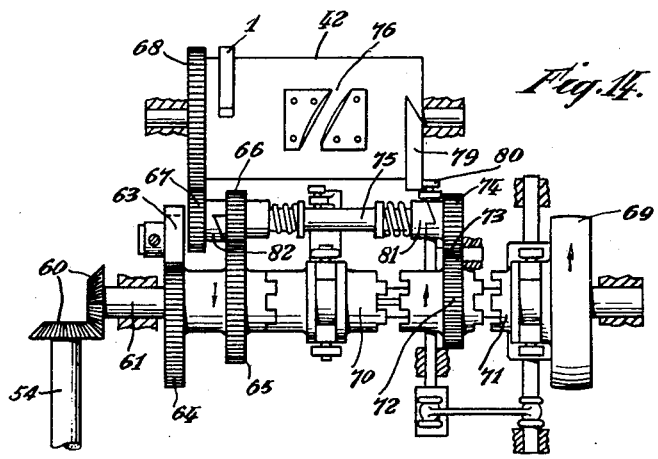
Benedikt Leuthold
By Fraser, Myers & Manley
Att'ys.

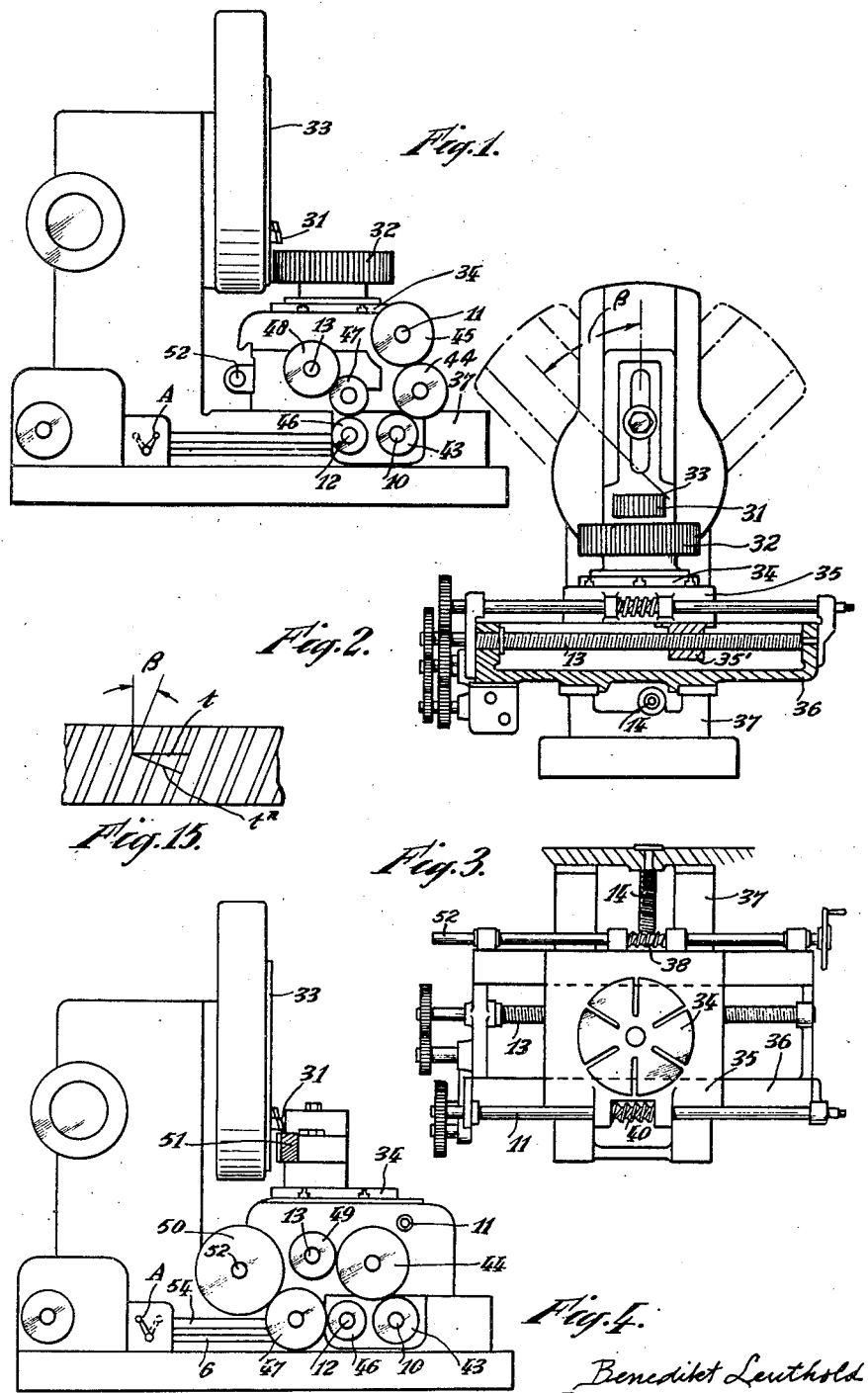

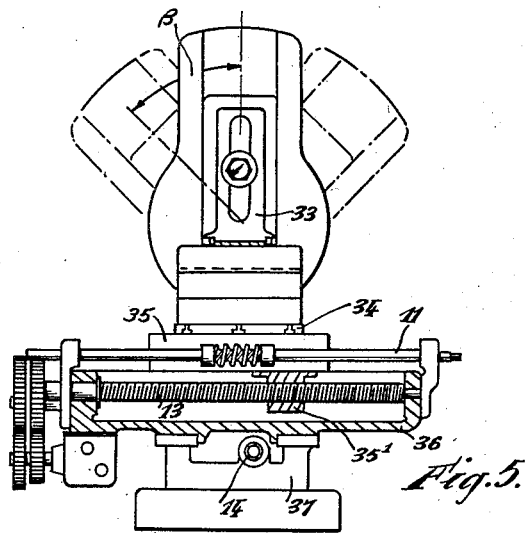
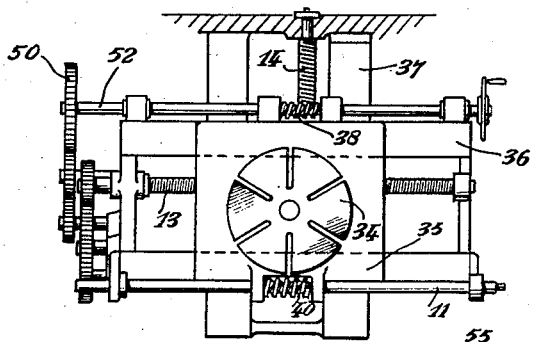
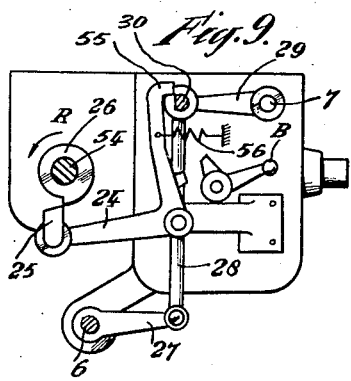
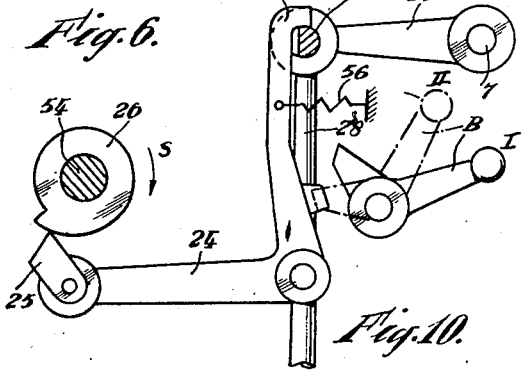

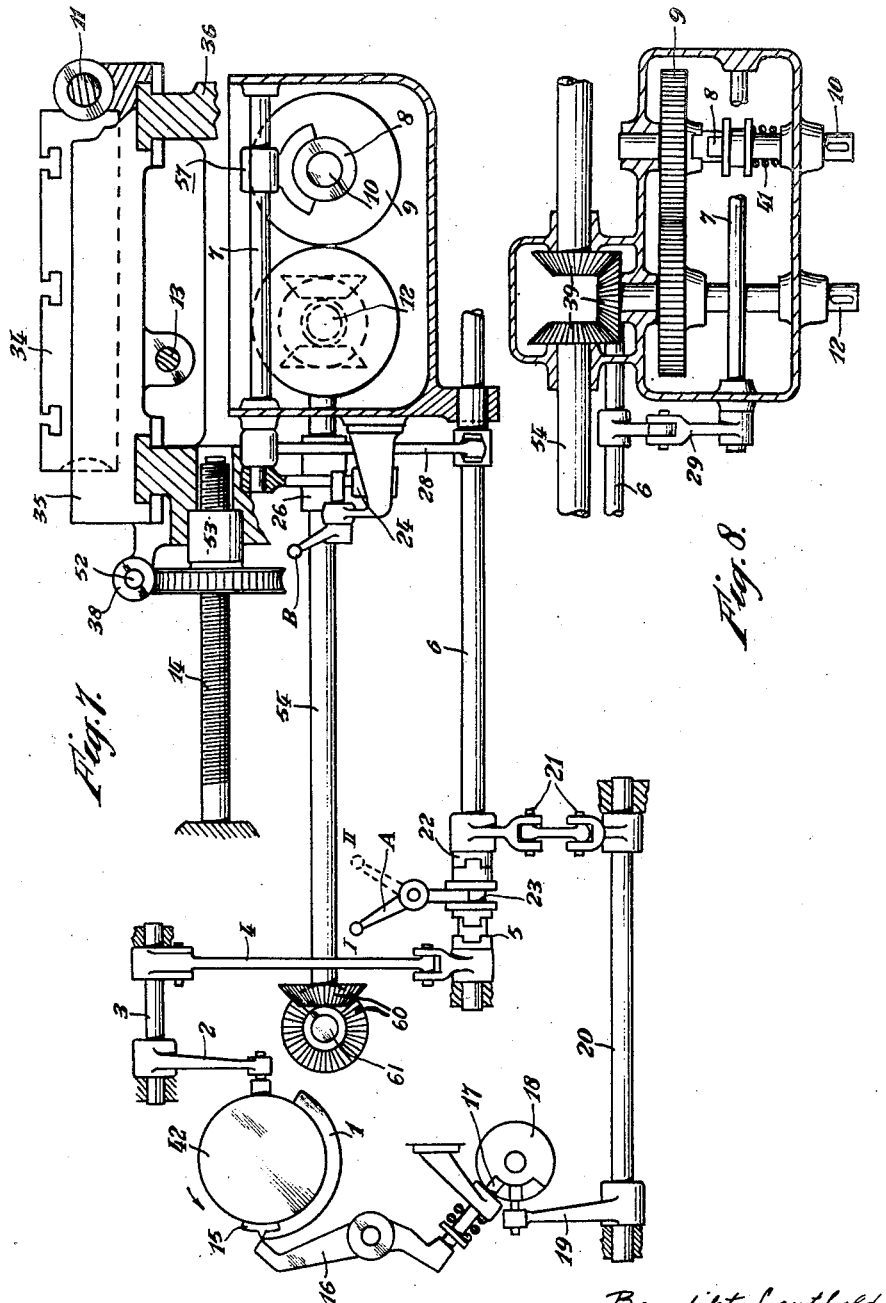

UNITED STATES PATENT OFFICE 2,507,725

GEAR CUTTING MACHINE

Benedikt Leuthold, Zurich, Switzerland, assignor to Maag Zahnrader und Maschinen, A. G., Zurich, Switzerland, a body corporate of Switzerland Application August 3, 1948, Serial No. 42,190
In Great Britain August 12, 1947

3 Claims. (Cl. 90—8)

This invention relates to gear cutting apparatus.

It is known to provide a gear planing or shaping machine of the multiple-tooth rack-cutter type for producing involute teeth on gear wheels, and it is an object of the present invention to make possible the use of a machine of this kind for cutting gear teeth on rectilinear rack rods by making a few simple changes in the construction and method of use of the said machine.

In order to enable the nature of this invention to be more clearly understood, it will be desirable first to explain as much of the said machine as may be necessary for an appreciation of the aforementioned changes to be made therein by the present invention.

A multiple-tooth rack-cutter carried by a tool holder operated by a ram is rectilinearly reciprocated perpendicularly to the plane of the gear wheel blank so as to cut teeth out of the edge of the blank, but does not itself rotate, the rolling motion necessary for the production of teeth of involute form being brought about by rotation of the blank. As the feed is effected by causing the blank to travel past the cutter, this means that the blank has to undergo both a rotary and a rectilinear feed motion. For this purpose, the blank is adapted to be fixed in position on a rotating work table which in turn is mounted on a slide capable of rectilinear travel in a direction parallel with the line of the rack-cutter teeth. In order for the blank to execute the correct rolling motion upon the teeth of the rack-cutter to produce gear teeth of involute form, the direction of rotation of the work table, viewed at the point where the cutting operation takes place, is opposite to the direction of the rectilinear feed of the slide. The combined rolling feed motion is intermittent and occurs only during the return strokes of the ram and cutter, the blank being momentarily at rest while a cutting operation is actually being performed. A worm meshing with a worm-wheel connected to the work table imparts the rotary motion to the latter, whilst the rectilinear motion of the slide is effected by means of a rotating screw-threaded spindle on which courses a traversing nut fixed to the slide, both worm and spindle being power-driven. The slide is in turn mounted on another slide herein referred to as the "cross-slide" which is hand-operated and by which the wheel blank can be radially moved towards and away from the cutter and the radial depth of the cut can be adjusted. To distinguish the cross-slide from the first mentioned slide, the latter will be herein referred to as the "traversing slide." The automatic feed motions of the work table and traversing slide are controlled by a series of cams in a cam drum.

In operation, the gear wheel blank is intermittently fed forward by a predetermined distance past the cutter with a rolling motion upon the rack-teeth of the latter, and when one gear tooth or a given number of teeth have been cut in the blank, the ram and cutter are stopped in a position clear of the blank, while the blank is caused to make a return movement through the same distance. During the reverse movement, however, there is no rotary motion of the blank but only a rectilinear backward travel thereof, the traversing slide being rectilinearly retracted whilst the rotation of the work table is stopped. In this way, when the combined rotary and rectilinear forward feed motion is thereupon resumed, the blank arrives at the cutter in a new position in which it is angularly displaced with respect to the cutter by the same number of tooth pitches as have been cut in the previous operation, thus presenting an uncut part of its edge for cutting. The above operations are then repeated, until all the gear wheel teeth have been cut.

According to the present invention, the changes which are made in order to enable a machine of the kind described to be used for cutting rack rod teeth by this method are in substance three changes of the automatic drive connections for the blank feeding means, viz:

(1) disconnecting from the work table the driving means for rotating it;

(2) disconnecting from the traversing slide the driving means therefor and connecting to the traversing slide the driving means previously used for rotating the work table, and, (3) connecting to the cross-slide the driving means previously used for driving the traversing slide.

The aforementioned three changes result in the movements of the traversing slide and of the cross-slide coming under the control of the cam element which previously controlled the work table and the traversing slide respectively, except that, as will be presently appreciated, it is also necessary to reverse the function of the cam control which previously directed the movements of the work table, so that when controlling the traversing slide it causes movement during the period in which it previously caused stopping and vice versa.

The constructional details of the aforementioned changes may be so arranged as to make the machine readily reconvertible for use in cutting gear wheel teeth, the result being to enable the machine to be used for teeth production on either gear wheels or rack rods as desired by a comparatively simple switch-over.

Dealing now in some detail with the aforementioned changes, it will be seen that the rotary motion of the work table is completely dispensed with, and it can be regarded for all practical purposes as being an integral part of the traversing slide, but remains in use as before for fixing the blank thereon. The machine element which previously operated the worm gear of the work table now drives the screw-threaded spindle which effects the rectilinear movement of the traversing slide, and the latter comes under the control of the cam elements which previously controlled the movement of the work table, so however that, whereas the work table was in intermittent motion during the course of the cutting process, the traversing slide is now stopped during this process and is rectilinearly moved upon the completion of the process by a distance equal to the number of teeth which have been cut in that process. No reverse movement of the traversing slide takes place, as the cam elements for effecting this are now associated with the drive of the cross-slide. The latter which was previously hand-operated, likewise by means of a screw-threaded spindle working in a nut attached to the cross slide, now has its spindle automatically driven by the machine element which previously operated the spindle of the traversing slide, and comes under the control of the cam elements which previously caused the forward and reversing movement of the traversing slide. The cross-slide is therefore intermittently fed forward, i. e. towards the cutter, during the course of the cutting process and is retracted therefrom upon completion of the process, each process resulting, as before, in one tooth or a predetermined number of teeth being cut. No other changes are necessary and the same type of multiple-tooth rack-cutter can be used for cutting rack rod teeth as was previously used for cutting gear wheel teeth.

The operation of the machine, when converted for use in cuttting rack rod teeth, is as follows:

The machine is set for the required number of teeth to be cut in one cutting process, so for example that two cutter teeth simultaneously begin to cut out the first two tooth gaps at one end of the rack rod blank, the cross-slide being advanced by a small amount towards the cutter after each cutting stroke thereof. When the two tooth gaps have been cut out to their full depth, the reciprocating movement of the cutter and its ram is stopped in a position clear of the rack rod blank, whereupon the cross-slide is retracted from the cutter by the same distance that it has just been advanced, and simultaneously the blank is fed forward past the cutter by movement of the traversing slide through a distance equal to the two pitches of the teeth already cut. Reciprocation of the cutter ram and step-by-step advance of the cross-slide are then resumed until the next two teeth of the rack rod have been cut. The same two cutter teeth are used in each cutting process, and the remaining cutter teeth merely play up and down in the tooth gaps of the rack rod already cut without removing any further material therefrom, as long as the first two cutter teeth have not been worn down. When after prolonged use the operative cutter teeth are worn down, the remaining cutter teeth take over.

As in the case of gear wheels, the machine can be set for cutting inclined teeth on rack rod blanks as well as ordinary straight teeth. For cutting inclined teeth, the cutter ram is adjusted to a position at an angle with respect to the perpendicular equal to the angle of inclination of the teeth to be cut, and the amount of forward feed of the traversing slide after each cutting process is adjusted accordingly. In this respect, the machine does not differ materially from that for cutting gear wheel teeth.

In order that the invention may be more readily understood a specific example of one form of apparatus made to carry out the present invention is hereinafter described with reference to the accompanying drawings, wherein:

Figs. 1 to 3 show three views of the machine adjusted for cutting teeth on a gear wheel blank.

Figs. 4 to 6 show corresponding views of the machine adjusted for cutting teeth on a rack rod blank.

Fig. 7 shows the control apparatus for controlling the rolling and reversing motions.

Fig. 8 shows the transmission box by which the various motions are transmitted.

Figs. 9 to 10 show details of the control apparatus in a plane perpendicular to that shown in Fig. 7.

Figs. 11 to 12 show further details of the control apparatus.

Figs. 13 to 14 show an elevation and plan view of the control drum and associated parts.

Fig. 15 shows a rack rod formed with inclined teeth.

A ram 33 carrying a multiple tooth rack cutter 31 makes reciprocating strokes across the edge of a gear wheel blank 32. The blank 32 is supported on a rotatable work table 34, mounted on a traversing slide 35 which, in turn, is mounted on a cross slide 36. The slide 36 is guided on a bed 37 and is movable by means of a lead screw 14 driven by a worm 38 on a shaft 52 which is hand operated when the machine is used for gear cutting.

Rotation of the table 34 is effected by a worm 40, mounted on a shaft 11, which meshes with a worm wheel connected to the table 34. The slide 35 is traversed by means of a lead screw 13, which engages with a traversing nut 35'. The combined rotary and traversing movements together make up a rolling movement of the blank relative to the rack tool 31, which is necessary for the formation of involute teeth on a wheel.

The rolling and reversing motion of the blank is controlled by the control apparatus shown in Figs. 7 to 14, of which the most important part is a control drum 42, which effects the change over between the various movements. In the course of one cycle of operations the control drum effects one complete revolution, one half during the cutting and the other during the reverse motion. The drive of the control drum 42 during the cutting is effected by a rod 62, connected to the tool ram 33. The rod 62, for every stroke of the tool ram, causes a pawl 63 to advance a ratchet wheel 64 one step. The ratchet 64 in turn drives the control drum 42 through two pairs of gear wheels 65 and 66, 67 and 68 (Fig. 14). The ratchet 64 is rotatably mounted on a shaft 61 and is coupled thereto during the cutting operation by means of a splined clutch sleeve 70, by which means the ratchet wheel 64 drives a main shaft 54 through the shaft 61 and a bevel wheel pair 60, the shaft 54 transmitting drive through bevel wheels 39 to a shaft 12 (Figs. 7 and 8). The latter in turn drives through gear wheels 46, 47, 48 (Fig. 1) the lead screw shaft 13 associated with the traversing slide 35. The bevel gears 39 through gear wheels 9 also drive a shaft 10 (Figs. 7 and 8), which in turn drives, through gear wheels 43, 44, 45 (Fig. 1), the worm shaft 11, which causes the rotation of the table 34. In this way the rolling motion is applied to the gear blank step by step in the interval between the cutting strokes of the tool ram 33. At the end of the rolling movement, it is necessary to draw the traversing slide 35 back to its original position without counter rotation of the table 34, so that the blank at the beginning of the ensuing cutting operation is in the same angular position relative to the cutter. To effect this the shaft 12 must be rotated backwards an equal number of revolutions as it performs in the cutting operation, whilst at the same time the rotation of the shaft 10 is stopped.

The shaft 12 is driven from the shaft 61 as already explained. On the shaft 61 is mounted a freely rotatable belt pulley 69, which is continuously driven to rotate counter to the movement of the ratchet wheel 64, and is provided with a clutch flange 71. The pulley 69 is slidable on the shaft 61 to bring the clutch flange 71 into and out of engagement with a complementary clutch flange on a pinion 72 loosely mounted on the shaft 61 and coupled, through gear wheels 73 and 74, to a shaft 75 driving the control drum 42 (Figs. 13 and 14). The gear wheel 74 is freely rotatable on the shaft 75 so as not to be driven by the latter but to be able to drive it through a ratchet coupling 81.

As already explained, during the cutting operation the clutch sleeve 70 is coupled with the ratchet wheel 64 to transmit the intermittent motion of the latter to the shaft 61. After exactly half a revolution of the control drum 42, i. e. at the end of the cutting operation, when the movement of the tool ram and, hence, that of the ratchet 64 stops, a cam 76 on the control drum engages a fork 77 and moves the latter to disengage the clutch sleeve 70 from the ratchet wheel 64. Immediately on disengagement from the ratchet 64, the clutch sleeve 70 is moved by a spring-loaded toggle lever 78 into engagement with the pinion 72. At the same time, a cam 79 on the control drum 42 actuates a system of links and levers 80 to slide the belt pulley 69 so as to bring its clutch flange into driving engagement with the pinion 72 which now drives the control drum shaft 75 through the gear wheels 73 and 74. The control drum 42 now continues to rotate in the same direction as before, but continuously and more rapidly, without however causing the shaft 75 to drive the ratchet 64 through the gears 65 and 66, because the gear 66 is loose on the shaft 75 and is connected to the gear 67 by a ratchet coupling 82 so that the gear 66 may drive the shaft 75 but cannot be driven by it in the direction used in operation. Furthermore, the belt pulley 69, through pinion 72 and clutch sleeve 70, drives, the shaft 61 counter to its original direction and at a greater speed, so that the traversing slide 35 is rapidly retracted to its starting position.

During the reversing movement the rotary movement of the work table must be stopped. The disengagement effected automatically. A cam 1 on the control drum 42 (see Fig. 7) causes arcuate movement of a lever 2, which is transmitted through a shaft 3 and connecting rod 4 to a clutch sleeve 5 rotatably mounted on a shaft 6, while the machine is being used for gear cutting, a change-over lever A is placed in position II, and in this position it causes a sliding clutch sleeve 23, splined on the shaft 6, to engage the clutch sleeve 5, thus coupling the latter to the shaft 6. A lever 27 and connecting rod 28 (Figs. 8 and 9) transmit the rotation of the shaft to a lever 29, keyed to a shaft 7. On the shaft 7 is also keyed the fork 57, which, on rotation of the shaft 7 operates the clutch 8 to disengage the shaft 10 from the driving gear 9. In this way the drive is disconnected from the table during the reverse movement of the traversing slide 35, so that the gear blank on being retracted is in the correct position to begin the next cycle of operation.

After another half revolution of the control drum 42, a second cam 76 on the drum (it is on the side of the drum opposite to that visible in Fig. 14 and carrying the first cam 76) engages the fork 77 and reverses the process, re-engaging the clutch sleeve 70 with the wheel 65. At the same time the clutch flange 71 is disengaged from the pinion 72 by the interaction of the cam 79 and the links 80. The cutting operation of a fresh cycle now begins.

To convert the machine to rack rod cutting it is first necessary to eliminate the rotary movement of the table 34. Then the parts effecting the rotation of the table are connected to the lead screw 13 to drive the traversing slide 35 and the driving parts effecting the step-by-step traversing and the reversing motion are connected to the lead screw 14 driving the cross slide 36. For this purpose, gear wheel 45 is removed from the shaft 11, and gear wheel 44, which is driven from the shaft 10, is connected through a gear wheel 49 with the shaft of lead screw 13 driving the traversing slide 35. Thereupon, gear wheel 47 which is coupled to shaft 12 is brought into engagement with a gear wheel 50 on shaft 52, so that the latter now drives the lead screw 14 through the worm 38 (see Fig. 6). The circles representing gear wheels in Figs. 1 and 4 are not intended to represent any particular gear ratios, so that circles of different sizes are given the same numbers in the two drawings for convenience. These re-arrangements are shown in Fig. 4 and by this means the transmission means are connected to the slides 35 and 36 for cutting rack rod teeth. However, it is also necessary to adjust the control apparatus shown in Figs. 7 to 12 accordingly. This is done simply by turning the change-over lever A and also another change-over lever B from position II (gear wheel cutting) to position I (rack rod cutting). The operation is now as follows:

As many tooth gaps can be cut in the rack rod blank 51 in a single cycle of operations as there are teeth of the cutter tool 31. Whereas in cutting gear wheel teeth, the shafts 10 and 12 cause the wheel blank to be rolled forward a short distance after each cutting stroke of the tool 31; in the cutting of rack rod teeth, the shaft 12 rotates the shaft 52 through the gearing 46, 47, 50 in a similar step-by-step movement to drive the worm gear 38 and the lead screw nut 53 (Fig. 7), whereby the slide 36 and with it the rack rod blank 51 is fed forward towards the tool 31 by short distances, likewise after every cutting stroke of the tool. If, for example, two teeth are to be cut in each working cycle, the machine is so adjusted that the first two teeth of the rack-cutter do the cutting work while the other teeth merely play up and down in the tooth gaps already cut in the blank without removing any metal therefrom. These other teeth only start doing any cutting when the first two teeth have undergone some wear. While cutting is taking place, the shaft 54, which drives the shafts 10 and 12, rotates in the direction of arrow S, Fig. 10. Secured to the shaft 54 is a snail cam ring 26, Figs. 9 and 10, which during each revolution of the shaft strikes a spring loaded lever 25 pivotally mounted on the end of a bell-crank lever 24, the lever 25 having an inclined face adapted to co-operate with the cam. The cam pivots this lever without causing movement of the lever 24.

The machine is adjusted so that, when the two tooth gaps in the rack rod blank have been cut to their full depth, the tool ram 33 is stopped as soon as it is outside the tooth gaps, whereupon retraction of the slide 36 away from the tool begins, accompanied by longitudinal motion of the traversing slide 35 to bring the blank into position for the next cutting cycle. To effect this the direction of rotation of the shaft 54 is reversed to that indicated by the arrow R in Fig. 9. The snail cam ring 26 is now no longer able to tilt the lever 25, and it, therefore, depresses it, causing the bell-crank lever 24 to be rocked. The change-over lever B being in position I (Fig. 10), the bell crank lever 24 during the rotation of shaft 54 in direction S, is pulled over by spring 56 so that the latch nose 55 provided on the top of lever 24 is kept in engagement with a projection 30 on the lever 29 and thus the clutch 8 is locked in its disengaged position, so that the shaft 10, and with it the slide 35, are stationary during the cutting phase of the cycle. When, however, the shaft 54 is rotating in direction R the rocking of the bell-crank lever by the cam ring 26 during the reverse rotation of shaft 54, which causes withdrawal of the slide 36 away from tool 31, releases the projection 30 (Fig. 9) so that shaft 7 is free to rotate again and the clutch 8 is immediately moved to the engaged position by a spring 41, Fig. 8, to couple the gear wheel 9 to shaft 10. Since change-over lever A is also in position I, the clutch 23 will have uncoupled shaft 6 from shaft 3, so that cam 1, which in gear wheel cutting disengaged clutch 8 during the phase while shaft 54 was reversed, is not now in use at all. The drive is thus transmitted to the gear wheels 43, 44, 49 and lead screw 13, so that the slide 35 with the rack rod blank supported on it is moved parallel to the rack cutter 31 by a distance equal to two tooth pitches. To disengage the drive to the shaft 10, the machine is arranged so that a cam 15 on the control drum 42, strikes a lever 16 and rocks it. The other arm of this lever is thereby caused to force a spring-loaded pin 17 into engagement with a groove in a rotating cam disc 18, Figs. 11 and 12. The latter is thus displaced axially towards a lever 19 and rocks it, whereby the shaft 20 on which lever 19 is secured, is rotated a little, such rotation being transmitted through connecting rods 21 to a clutch sleeve 22, which, owing to change-over lever A being in position I, is in engagement with clutch member 23 on shaft 6 and rotates the latter. The shaft 6 transmits its rotation via lever 27, rod 28 and lever 29, to shaft 7 which, by means of fork 57, moves clutch 8 to disengage driving gear wheel 9 from shaft 10, the latter being stopped, so that the motion of the slide 35 is discontinued after a distance equal to two teeth on the rack. The lever 29, which had been moved upwards when spring 41 engaged clutch 8 as previously described, is thus moved downwards, making it possible for latch nose 55 on bell-crank lever 24, now no longer acted on by cam ring 26, to follow the pull of spring 56 and once more engage with projection 30 of lever 29, which is therefore held in this position with all its associated parts including clutch 8, the latter thus remaining disengaged while control drum 42 initiates the cutting phase of a fresh working cycle. Not until this phase is completed does control drum 42 effect another reversal of shaft 54 so that cam ring 26 may again unlatch nose 55 of bell-crank lever 24 from projection 30 to cause clutch 8 to be re-engaged for a further longitudinal movement of the traversing slide by a distance of two tooth pitches. It will be apparent that the locking mechanism shown in Figs. 9 and 10 is inoperative during gear wheel cutting because the change-over lever B is then in position II in which it holds the bell-crank-lever 24 against the action of spring 56 so that latch nose 55 is kept clear of projection 30, and snail cam ring 26 does not cooperate with lever 25. It will be seen therefore that clutch 8 is in engagement to transmit drive during the cutting phase in gear wheel cutting and during the reversing phase in rack rod cutting.

The machine thus described can be used for cutting both straight and inclined teeth on rack rods. In the latter case, the tool ram 33 is simply adjusted to an angular position with respect to the normal, as shown in Fig. 5, the angle being equal to the angle of inclination $\beta$ of the rack rod teeth, see Fig. 15, and the gear ratio of the gearing 43, 44, 45 transmitting drive to the lead screw 13 of slide 35 is so chosen that the longitudinal motion of the latter corresponds to the value $$t = \frac{tn}{\cos \beta}$$

where $tn$ is the distance between teeth measured normally.

What I claim and desire to secure by Letters Patent is:

1. In a gear cutting machine for use in cutting involute gear teeth and convertible to use in cutting rack rod teeth and vice versa, in combination, a reciprocable multiple tooth rack cutter, means for reciprocating said rack cutter, a rotatable work supporting means operatively associated with said rack cutter, cross feed means for moving said work supporting means towards and away from said rack cutter, traversing means for displacing said work supporting means parallel to the line of the teeth of said rack cutter, means for causing the rotation of said rotatable work supporting means, movement controlling means, a power-operated forward step-by-step driving means, a power-operated reverse continuous driving means, said forward driving means and said reverse driving means being alternately engaged by the operation of said movement controlling means, first drive transmitting means, second disengageable drive transmitting means, automatic means for disengaging said second drive transmitting means, change-over means to allow said second drive transmitting means to be disengaged during the engagement of said forward driving means or said reverse driving means, means for connecting said first drive transmitting means alternately to drive said traversing means during gear cutting or to said cross feed means during rack rod cutting and means for connecting said second drive transmitting means alternately to drive said rotatable work supporting means during gear cutting or to said traversing means during rack rod cutting.

2. In a gear cutting machine for use in cutting involute gear wheel teeth and convertible to use in cutting rack rod teeth, in combination, a reciprocable multiple-tooth rack cutter, means for reciprocating said cutter, a rotatable work supporting table operatively associated with said cutter, a cross feed slide for moving said table towards and away from said cutter, a traversing slide for displacing said table parallel to the line of the teeth of said cutter, means for causing the rotation of said table, movement controlling means, a power-operated forward step-by-step driving means, means for causing said forward driving means to operate in timed relation to the operation of said cutter reciprocating means, a power-operated reverse continuous driving means, a main shaft, first clutch means operable by said movement controlling means for coupling said main shaft to said forward driving means and to said reverse driving means alternately, a first drive transmitting shaft coupled to said main shaft, a second drive transmitting shaft, second clutch means engageable and disengageable for respectively coupling said second drive transmitting shaft to, and uncoupling it from, said main shaft, clutch actuating means operable by said movement controlling means for disengaging said second clutch means, change-over lever means adjustable between gear wheel cutting and rack rod cutting positions and being operatively associated with said clutch actuating means for causing said second clutch means, in said rack rod cutting position of said lever means, to be disengaged while said main shaft is coupled to said forward driving means and, in said gear wheel cutting position of said lever means, to be disengaged while said main shaft is coupled to said reverse driving means, means for connecting said first drive transmitting shaft alternatively to drive said traversing slide during gear wheel cutting or to drive said cross feed slide during rack rod cutting, and means for connecting said second drive transmitting shaft alternatively to drive said table rotating means during gear wheel cutting or to drive said traversing slide during rack rod cutting.

3. The combination claimed in claim 2, wherein said clutch actuating means comprises first and second actuating mechanisms operable independently of each other by said movement controlling means for disengaging said second clutch means, said second actuating mechanism being rendered ineffective by said lever means in said rack rod cutting position thereof, and said first actuating mechanism being rendered ineffective by said lever means in said gear wheel cutting position thereof, and said movement controlling means comprising first cam means for operating said first clutch means, second cam means for operating said first actuating mechanism and becoming operative when said first cam means causes said first clutch means to couple said main shaft to said forward driving means, and third cam means for operating said second actuating mechanism and becoming operative when said first cam means causes said first clutch means to couple said main shaft to said reverse driving means.

BENEDIKT LEUTHOLD.

REFERENCES CITED

The following references are of record in the file of this patent:

UNITED STATES PATENTS

| Number | Name | Date |
|---|---|---|
| 1,290,270 | Maag | Jan. 7, 1919 |
| 1,583,790 | Green | May 11, 1926 |
| 1,907,000 | Parr | May 2, 1933 |

FOREIGN PATENTS

| Number | Country | Date |
|---|---|---|
| 185,916 | Great Britain | Sept. 21, 1922 |